(12) United States Patent
Warnke (10) Patent No.: US 9,233,702 B1
(45) Date of Patent: Jan. 12, 2016

(54) CONVERTIBLE DOLLY CART SYSTEM

(71) Applicant: Heartland Products LLC, Elk River, MN (US)

(72) Inventor: John Martin Warnke, Elk River, MN (US)

(73) Assignee: Heartland Products, LLC, Elk River, MN (US)

(*) Notice: Subject to any disclaimer, the term of this patent is extended or adjusted under 35 U.S.C. 154(b) by 0 days.

(21) Appl. No.: 14/264,319

(22) Filed: Apr. 29, 2014

Related U.S. Application Data

(60) Provisional application No. 61/824,751, filed on May 17, 2013.

(51) Int. Cl.
*B62B 3/02* (2006.01)

(52) U.S. Cl.
CPC .................................. *B62B 3/02* (2013.01)

(58) Field of Classification Search
CPC .......... B62B 5/0083; B62B 3/10; B62B 3/00; B62B 3/002
USPC .............................. 280/79.2, 79.11
See application file for complete search history.

(56) References Cited

U.S. PATENT DOCUMENTS

| | | | |
|---|---|---|---|
| 4,793,624 A | 12/1988 | Mace | |
| 5,226,656 A | 7/1993 | Mayer | |
| 5,484,150 A * | 1/1996 | Yasutomi | 280/79.3 |
| 6,663,123 B1 * | 12/2003 | Kovacs | 280/79.7 |
| 6,786,503 B1 | 9/2004 | Young | |
| 6,866,274 B1 * | 3/2005 | Muscat | 280/79.7 |
| 6,902,175 B1 | 6/2005 | Clavey | |
| D530,876 S | 10/2006 | Wyse | |
| D604,023 S | 11/2009 | Ogle | |
| 7,896,367 B1 * | 3/2011 | Suprono | 280/47.15 |
| 8,002,510 B2 * | 8/2011 | Williams | 414/10 |
| 8,100,419 B2 * | 1/2012 | Morisset | 280/79.7 |
| 2007/0085287 A1 | 4/2007 | Wyse | |
| 2012/0043731 A1 * | 2/2012 | Hassell | 280/79.2 |

* cited by examiner

*Primary Examiner* — John Walters
*Assistant Examiner* — James Triggs
(74) *Attorney, Agent, or Firm* — Neustel Law Offices (57) ABSTRACT

A convertible dolly cart system which may convert between a traditional floor dolly and a sheet goods cart in a quick and efficient manner. The convertible dolly cart system generally includes a flat, rectangular cart having a central opening and a panel support insert which is removably positioned within the central opening of the cart for use in transporting large sheets of material such as sheetrock or wall panels. The panel support insert includes a base on which the sheets of material may be placed and an upper support assembly against which the sheets of material may be rested. Thus, the present invention is easily convertible between a dolly cart and a sheet goods cart.

16 Claims, 7 Drawing Sheets

CONVERTIBLE DOLLY CART SYSTEM

CROSS REFERENCE TO RELATED APPLICATIONS

I hereby claim benefit under Title 35, United States Code, Section 119(e) of U.S. provisional patent application Ser. No. 61/824,751 filed May 17, 2013. The 61/824,751 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a dolly cart and more specifically it relates to a convertible dolly cart system which may convert between a traditional floor dolly and a sheet goods cart in a quick and efficient manner.

2. Description of the Related Art

Any discussion of the related art throughout the specification should in no way be considered as an admission that such related art is widely known or forms part of common general knowledge in the field.

Dolly carts are commonly used in various sites for movement of various heavy or bulky goods. For example, dolly carts are used widely at work sites for moving construction materials, appliances, and the like. However, when moving construction materials such as sheet rock or other sheets or materials, the sheets must be placed flat upon the dolly cart and thus be difficult to move around.

To efficiently move sheets of material, a sheet cart may be utilized. However, the sheet cart is not ideally suited for movement of large, bulky objects such as appliances. Thus, it is often required to have both a dolly cart and a sheet cart at a work site, which can take up space and be expensive to purchase.

Because of the inherent problems with the related art, there is a need for a new and improved convertible dolly cart system which may convert between a traditional floor dolly and a sheet goods cart in a quick and efficient manner.

BRIEF SUMMARY OF THE INVENTION

The invention generally relates to a convertible dolly cart which includes a flat, rectangular cart having a central opening and a panel support insert which is removably positioned within the central opening of the cart for use in transporting large sheets of material such as sheetrock or wall panels. The panel support insert includes a base on which the sheets of material may be placed and an upper support assembly against which the sheets of material may be rested. Thus, the present invention is easily convertible between a dolly cart and a sheet goods cart.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 7 illustrate a convertible dolly cart system 10, which comprises a flat, rectangular cart 20 having a central opening 25 and a panel support insert 30 which is removably positioned within the central opening 25 of the cart for use in transporting large sheets of material 12 such as sheetrock or wall panels. The panel support insert 30 includes a base 21 on which the sheets of material 12 may be placed and an upper support assembly 40 against which the sheets of material 12 may be rested. Thus, the present invention is easily convertible between a dolly cart and a sheet goods cart.

B. Cart

As shown throughout the figures, the present invention includes a cart 20 which includes wheels 27 and a central opening 25. The cart 20 may be comprised of various shapes, sizes, and configurations to accommodate different applications. In a preferred embodiment as shown in the figures, the cart 20 comprises a flat cart which has a plurality of caster wheels 27 to allow for movement of objects positioned upon an upper surface 21 of the cart 20.

Figure 1:
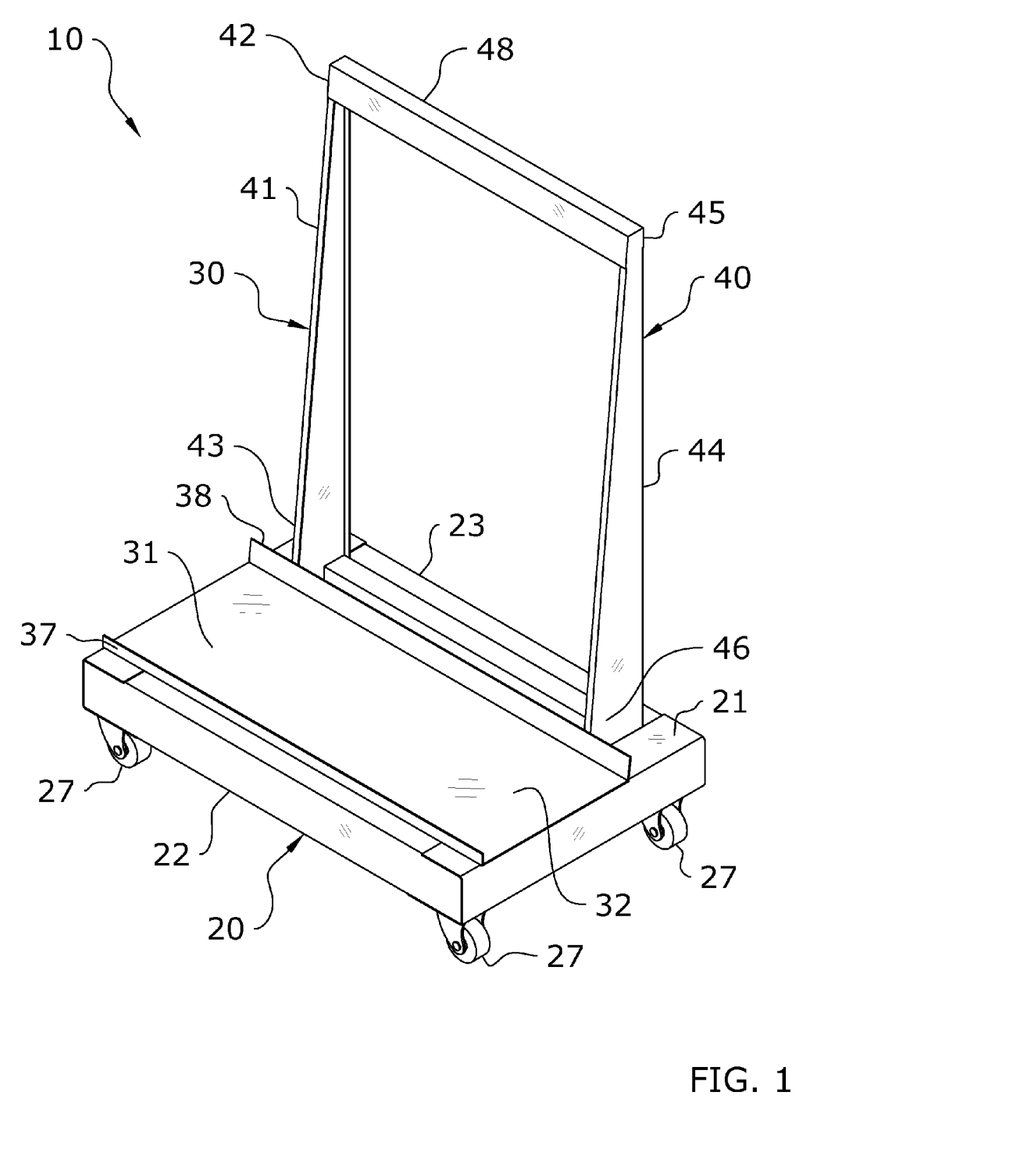
FIG. 1 is an upper perspective view of the present invention.
Figure 2:
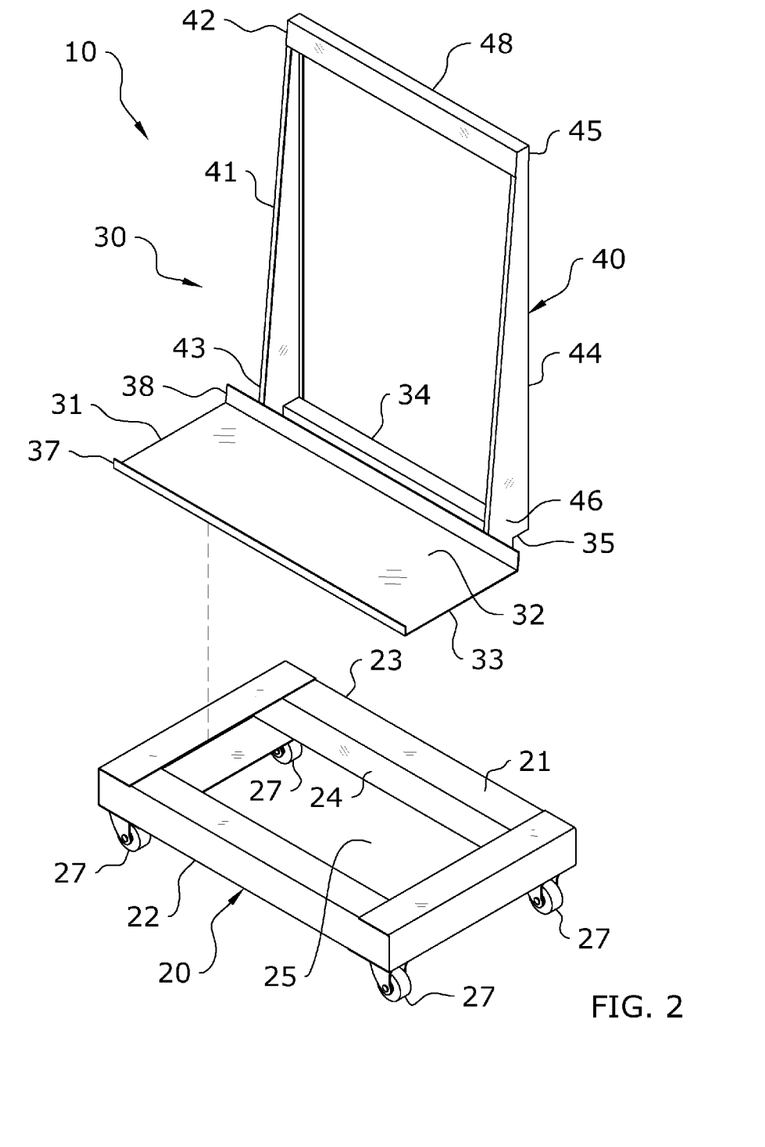
FIG. 2 is an upper perspective view of the present invention with the panel support insert removed from the cart.

As best shown in FIG. 2, the cart 20 may be comprised of a rectangular shape, though other shapes could be utilized. The upper surface 21 of the cart 20 is adapted to receive the panel support insert 30 of the present invention by utilizing a central opening 25. The lower surface 22 of the cart 20 generally includes one or more wheels 27, such as the caster wheel configuration shown in the figures.

The central opening 25 of the cart 20 receives the panel support insert 30 to allow the panel support insert 30 to be removably mounted to the upper surface 21 of the cart 20. The cart 20 includes an outer edge 23 and an inner edge 24, which the inner edge 24 defining the central opening 25. Though the central opening 25 is shown in the figures as comprising a rectangular opening, it should be appreciated that other shapes may be utilized in different embodiments.

The wheels 27 may be comprised of the caster wheel configuration shown in the figures or other configurations which allow for smooth movement of the cart 20. The figures illustrate an embodiment which includes four caster wheels 27, which each of the caster wheels 27 being positioned at a corner of the lower surface 22 of the rectangular cart 20. The numbering, placement and configuration of the wheels 27 shown in the figures is merely illustrative and should not be construed as limiting on the scope of the present invention.

C. Panel Support Insert

Figure 4:
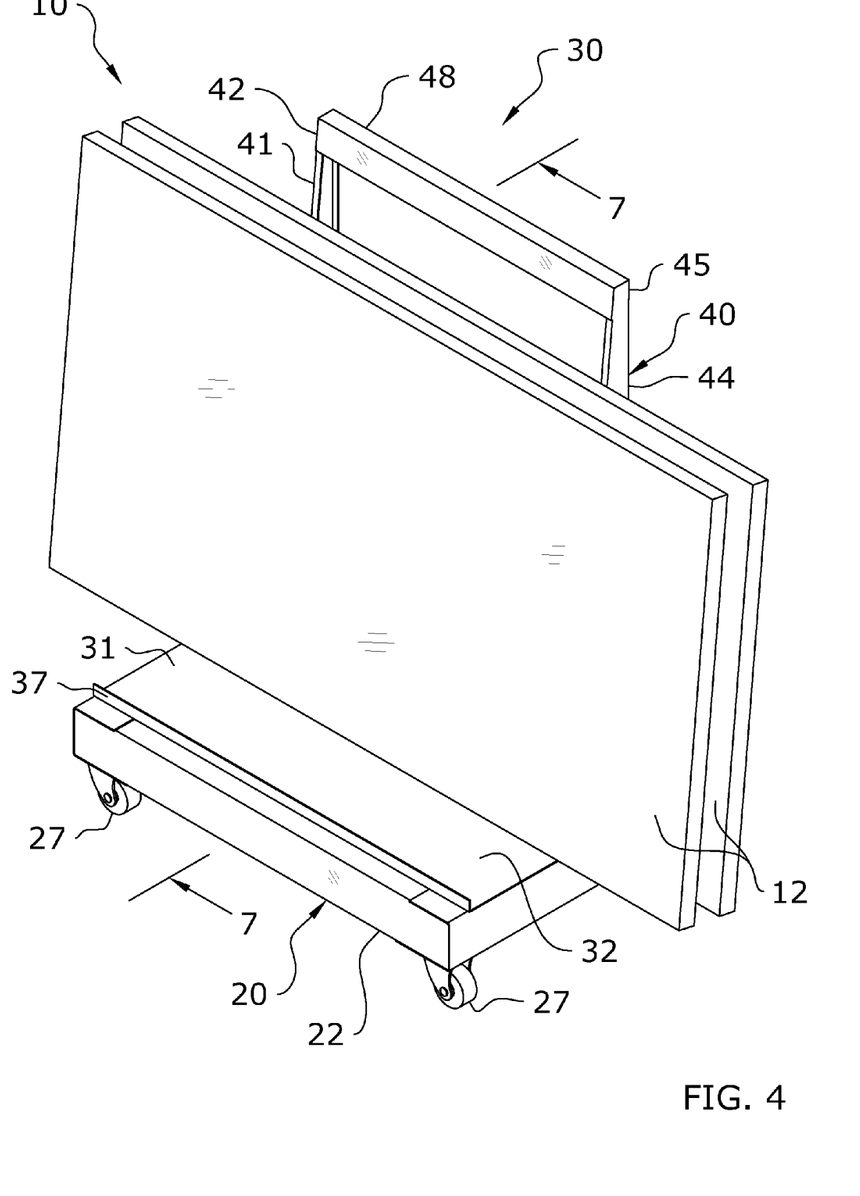
FIG. 4 is an upper perspective view of the present invention in use to transport sheets of material.
Figure 5:
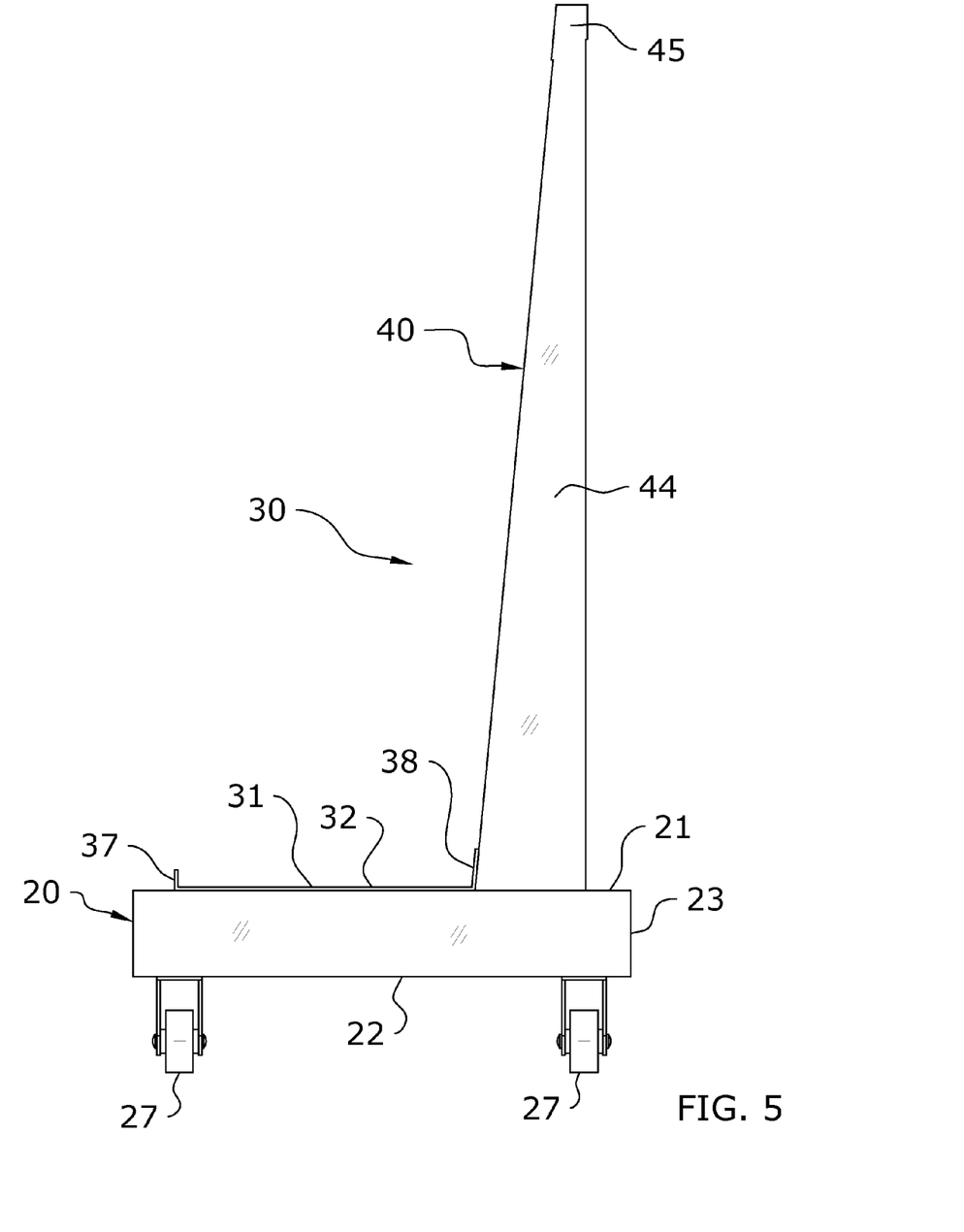
FIG. 5 is a side view of the present invention.
Figure 7:
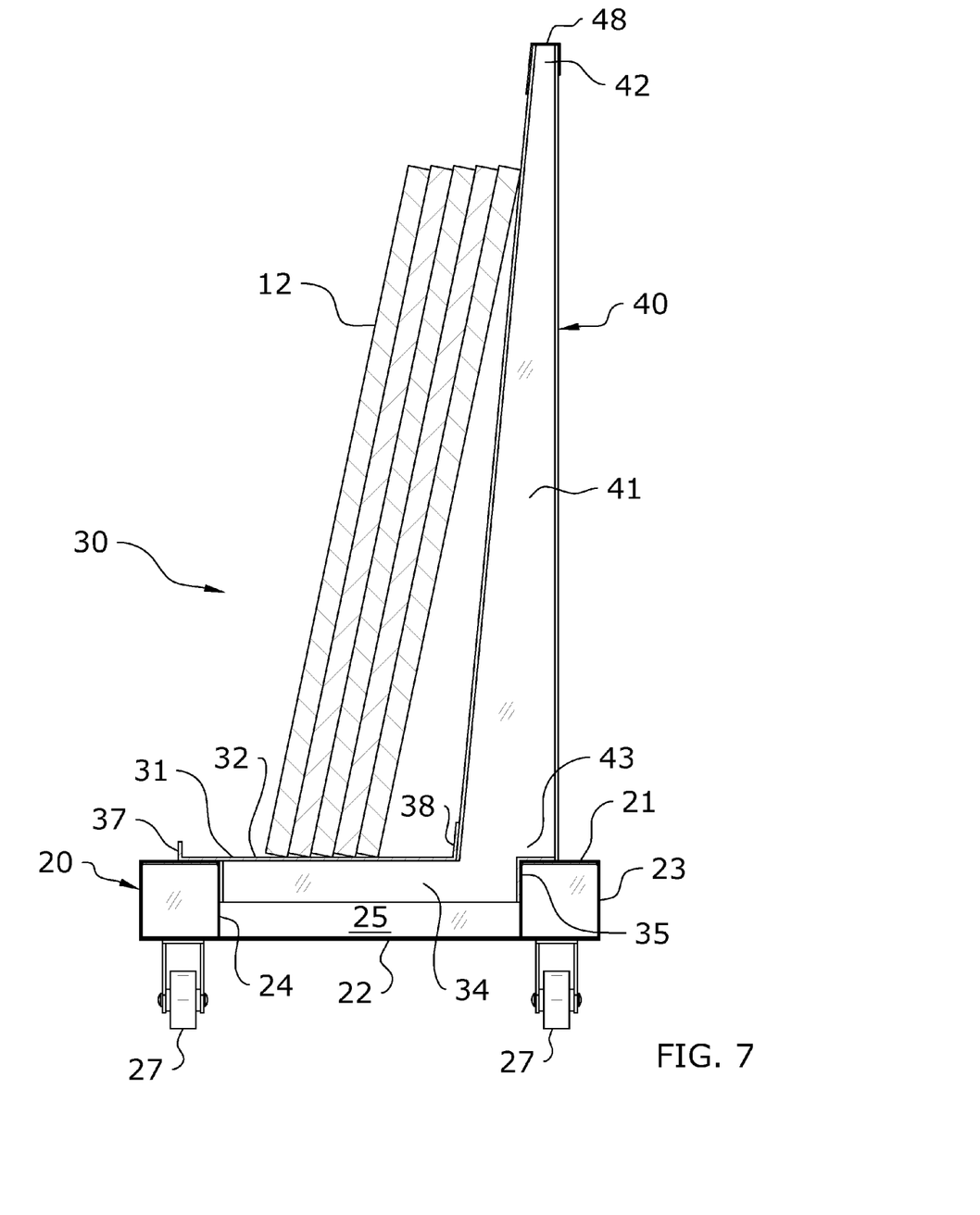
FIG. 7 is a side view of the present invention in use to transport sheets of material.

As shown throughout the figures, the present invention includes a panel support insert 30 which is removably positioned within the central opening 25 of the cart 20 for use in transporting large sheets of material 12 such as sheetrock or wall panels. As best shown in FIG. 2, the panel support insert 30 includes a support base 31 which fits within the central opening 25 of the cart 20. The panel support insert 30 also includes an upper support assembly 40 which is adapted to retain the sheets of material 12 being transported with the present invention as best shown in FIGS. 4 and 7.

Figure 3:
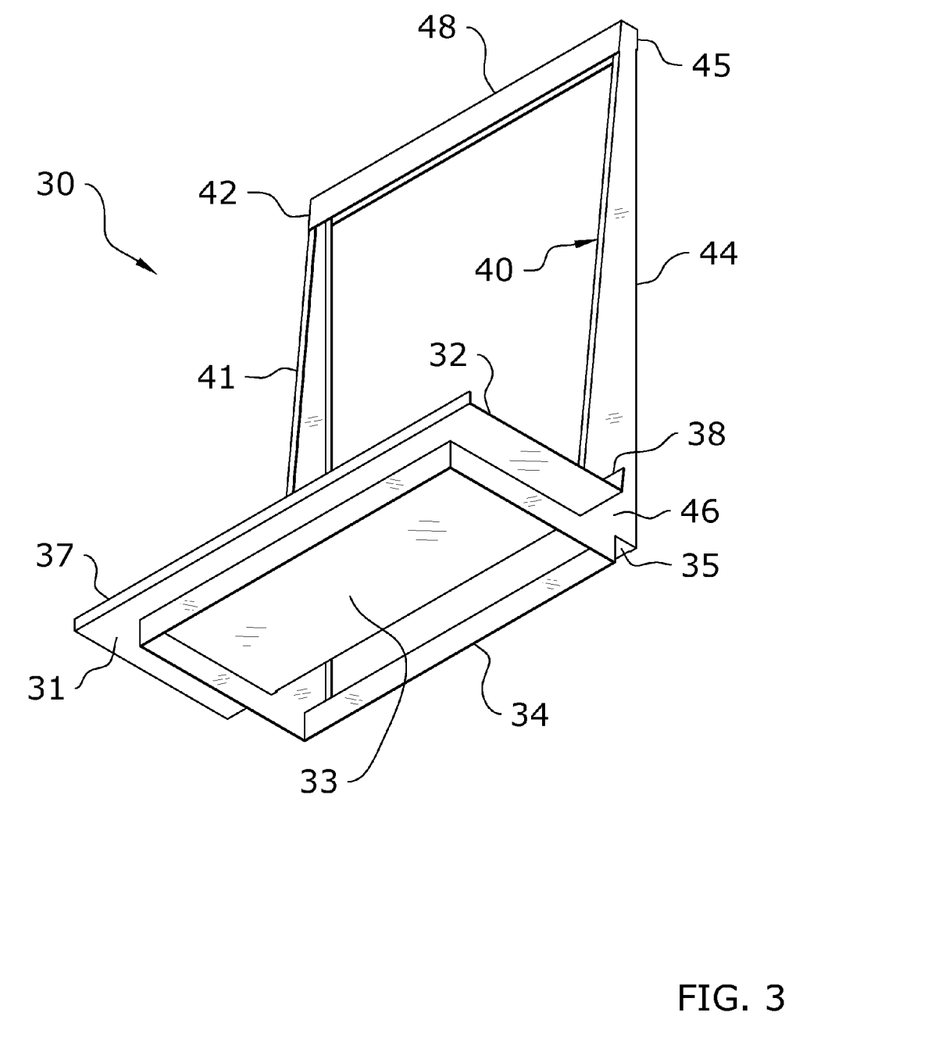
FIG. 3 is a lower perspective view of the present invention.

The panel support insert 30 may comprise a variety of shapes, sizes, and configurations for different embodiments of the present invention. In a preferred embodiment as best shown in FIGS. 2 and 3, the panel support insert 30 includes a support base 31 and an upper support assembly 40 extending upwardly therefrom. The sheets of material 12 may be positioned on the support base 31 and leaned to rest against the upper support assembly 40 as shown.

The support base 31 includes an upper surface 32 and a lower surface 33. The support base 31 may be comprised of a U-shaped configuration as best shown in FIG. 2, with a first upper lip 37 extending upwardly from a first side of the upper surface 32 of the support base 31. A second upper lip 38 extends upwardly from a second side of the upper surface 32 of the support base 31 to form the U-shape. This configuration will aid in preventing items from falling off the support base 31.

As best shown in FIG. 3, the lower surface 33 of the support base 31 includes a lower rim 34. The lower rim 34 is formed by a continuous or a plurality of interconnected lips which extend downwardly from the lower surface 33 of the support base 31. The lower rim 34 is preferably the same shape and a slightly smaller size when compared to the central opening 25. The lower rim 34 fits within the central opening 25 to secure the panel support insert 30 to the cart 20.

Figure 6:
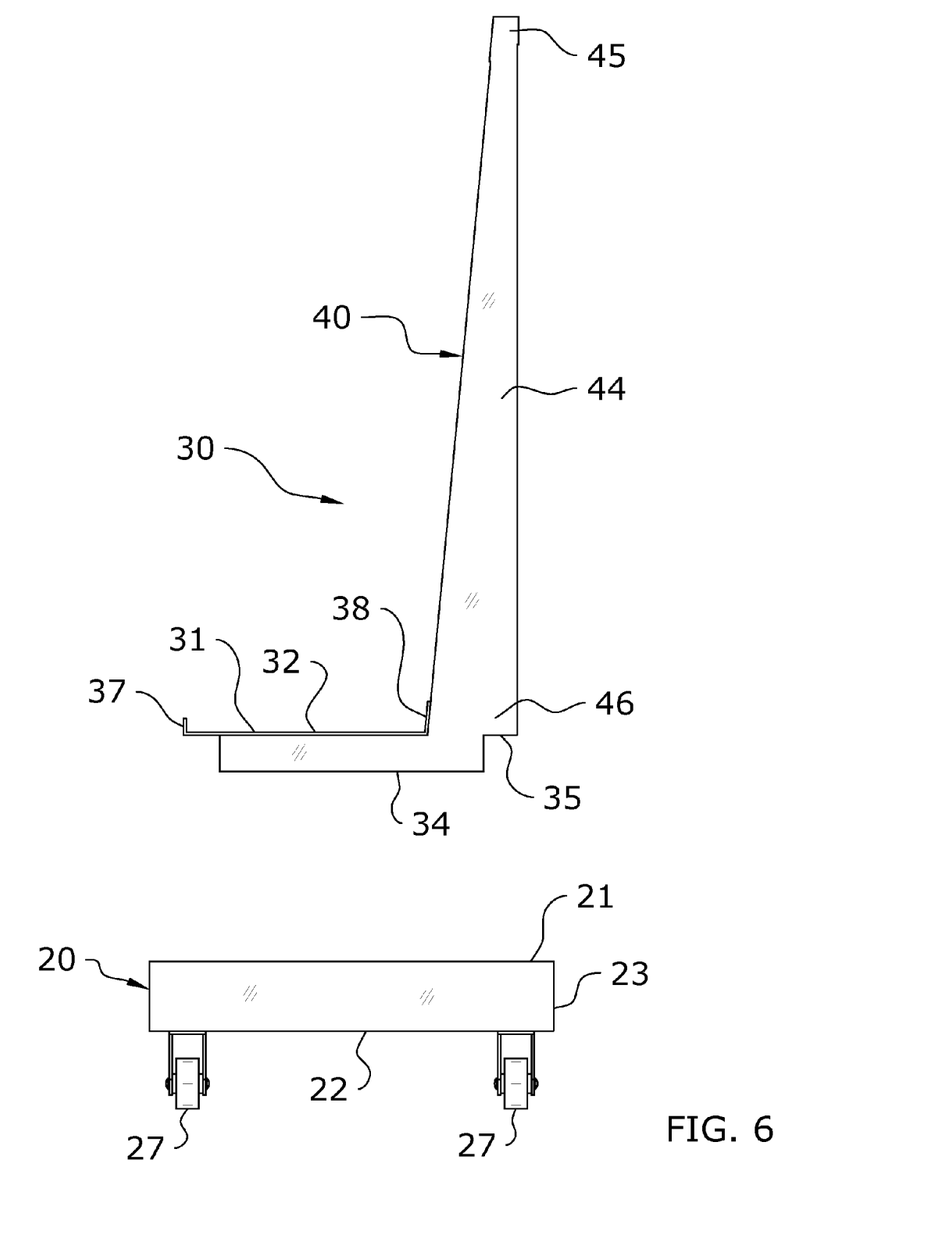
FIG. 6 is a side view of the present invention with the panel support insert removed from the cart.

The lower surface 33 of the support base 31 may also include a rear lower indentation 35 as best shown in FIGS. 3 and 6. The rear lower indentation 35 extends across the lower surface 33 of the support base 31 between the first and second support members 41, 44. The rear lower indentation 35 will rest upon the upper surface 21 of the cart 20.

The rear lower indentation 35 is generally comprised of a right angle forming a horizontal and vertical surface. When the panel support insert 30 is placed on the cart 20, the horizontal portion of the rear lower indentation 35 will rest upon the upper surface 21 of the cart 21. The vertical portion of the rear lower indentation 35 will rest upon the inner edge 24 of the central opening 25.

As shown throughout the figures, an upper support assembly 40 extends upwardly from the support base 31 of the panel support insert 30. The upper support assembly 40 is adapted to retain sheets of material 12 on the cart 20 as shown in FIG. 7. The upper support assembly 40 may be comprised of various configurations, including varying heights and widths, to accommodate different applications in different embodiments of the present invention.

In a preferred embodiment as shown in the figures, the upper support assembly 40 comprises a first support member 41 extending upwardly from a first side of the support base 31 and a second support member 44 extending upwardly from a second side of the support base 31. A cross member 48 extends between the upper end 42 of the first support member 41 and the upper end 45 of the second support member 44. Sheets of material 12 or other items will rest against the cross member 48 when the present invention is in use. The first and second support members 41, 44 each comprise elongated members which extend parallel with respect to each other and perpendicularly with respect to the upper surface 32 of the support base 30. The first support member 41 includes an upper end 42 and a lower end 43. The lower end 43 of the first support member 41 is connected to or integrally formed with the upper surface 32 of the support base 31 of the panel support insert 30. The upper end 42 of the first support member 41 is connected to or integrally formed with the cross member 48.

The second support member 44 similarly includes an upper end 45 and a lower end 46. The lower end 46 of the second support member 44 is connected to or integrally formed with the upper surface 32 of the support base 31. The upper end 45 of the second support member 44 is connected to or integrally formed with the cross member 48.

D. Operation of Preferred Embodiment

In use, the cart 20 may be utilized as a conventional dolly cart by placing a large, bulky object such as an appliance on the upper surface 21 of the cart 20 to be easily moved with the wheels 27. In the event that a sheet cart configuration is needed, the panel support insert 30 may be removably installed on top of the cart 20.

First, the panel support insert 30 is lowered on to the upper surface 21 of the cart 20. The lower rim 34 of the lower surface 33 of the support base 31 of the panel support insert 30 will fit within the central opening 25 of the cart 20. The rear lower indentation 35 will rest upon the upper surface 21 of the cart 20. This configuration will prevent the support base 31 from dislodging from the cart 20.

The sheets of material 12 may then be placed on the upper surface 32 of the support base 31 and then rested against the upper support assembly 40 as shown in FIG. 7. The cart 20 may be pushed to transport the sheets of material 12. When completed, the sheets 12 may be removed and the panel support insert 30 lifted off of the cart 20. The cart 20 may then be used further as a traditional dolly or converted again to a sheet good transport configuration.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A convertible dolly cart, comprising:
   a cart having a central opening and a plurality of wheels; and
   a panel support insert removably secured to said cart, wherein said panel support insert fits within said central opening for transporting large sheets of material, wherein said panel support insert comprises a support base and an upper support assembly extending from said support base, wherein said support base is comprised of a U-shaped configuration, wherein said support base includes a first upper lip and an opposing second upper lip to form said U-shaped configuration.

2. The convertible dolly cart of claim 1, wherein said cart is comprised of a flat cart having an upper surface and a lower surface.

3. The convertible dolly cart of claim 1, wherein said support base includes an upper surface and a lower surface, wherein said lower surface of said support base includes a lower rim.

4. The convertible dolly cart of claim 3, wherein said central opening is rectangular.

5. The convertible dolly cart of claim 4, wherein said lower rim is rectangular.

6. The convertible dolly cart of claim 3, wherein said upper support assembly extends from said upper surface of said support base.

7. The convertible dolly cart of claim 6, wherein said upper support assembly comprises a first support member, a second support member extending parallel with respect to said first support member, and a cross member extending between an upper end of said first support member and an upper end of said second support member.

8. A convertible dolly cart, comprising:
   a flat cart including a rectangular central opening; and
   a panel support insert that is removably positioned within said rectangular central opening of said flat cart for transporting large sheets of material, wherein said panel support insert includes a U-shaped base and an upper support assembly extending from said U-shaped base, wherein said U-shaped base includes an upper surface and a lower surface, wherein said lower surface of said U-shaped base includes a lower rim, wherein said lower surface of said U-shaped base includes a rear lower indentation for engaging with said cart.

9. The convertible dolly cart of claim 8, wherein said flat cart is comprised of a rectangular cart having an upper surface and a lower surface.

10. The convertible dolly cart of claim 8, wherein said lower rim is rectangular.

11. The convertible dolly cart of claim 10, wherein said upper support assembly extends from said upper surface of said U-shaped base.

12. The convertible dolly cart of claim 11, wherein said upper support assembly comprises a first support member, a second support member extending parallel with respect to said first support member, and a cross member extending between an upper end of said first support member and an upper end of said second support member.

13. The convertible dolly cart of claim 12, wherein said U-shaped base includes a first upper lip and an opposing second upper lip to form said U-shaped configuration.

14. The convertible dolly cart of claim 13, wherein said cart includes a plurality of wheels.

15. The convertible dolly cart of claim 14, wherein said plurality of wheels comprises a plurality of caster wheels.

16. A convertible dolly cart, comprising:
   a flat cart including a rectangular central opening, wherein said flat cart is comprised of a rectangular cart having an upper surface and a lower surface, wherein said lower surface of said cart includes a plurality of caster wheels; and
   a panel support insert that is removably positioned within said rectangular central opening of said flat cart for transporting large sheets of material, wherein said panel support insert includes a U-shaped base and an upper support assembly extending from said U-shaped base;
   wherein said U-shaped base includes an upper surface and a lower surface, wherein said U-shaped base includes a first upper lip and an opposing second upper lip to form said U-shaped configuration, wherein said lower surface of said U-shaped base includes a lower rim and a rear lower indentation, wherein said lower rim is rectangular, wherein said upper support assembly extends from said upper surface of said U-shaped base, wherein said upper support assembly comprises a first support member, a second support member extending parallel with respect to said first support member, and a cross member extending between an upper end of said first support member and an upper end of said second support member.

* * * * *